(12) United States Patent
Tillman et al.

(10) Patent No.: US 11,639,142 B2
(45) Date of Patent: May 2, 2023

(54) ELECTRONIC CONTROL MODULE WAKE MONITOR

(71) Applicant: Ford Global Technologies, LLC, Dearborn, MI (US)

(72) Inventors: Brian David Tillman, Dearborn, MI (US); Jaafar Abbass, Troy, MI (US); Paul Anthon Mueller, St. Claire Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 598 days.

(21) Appl. No.: 16/245,697

(22) Filed: Jan. 11, 2019

(65) Prior Publication Data

US 2020/0223376 A1  Jul. 16, 2020

(51) Int. Cl.
   *B60R 16/023*   (2006.01)
   *H04L 12/12*    (2006.01)
   *H04L 67/14*    (2022.01)

(52) U.S. Cl.
   CPC ............ *B60R 16/023* (2013.01); *H04L 12/12* (2013.01); *H04L 67/14* (2013.01)

(58) Field of Classification Search
   CPC ............ B60R 16/023; B60R 2011/001; B60R 2021/01286; H04L 12/12; H04L 67/14
   See application file for complete search history.

(56) References Cited

U.S. PATENT DOCUMENTS

| | | | |
|---|---|---|---|
| 5,419,824 A | 5/1995 | Weres et al. | |
| 5,531,875 A | 7/1996 | Shimamune et al. | |
| 6,063,142 A | 5/2000 | Kawakami et al. | |
| 6,326,098 B1 | 12/2001 | Itoh et al. | |
| 6,430,485 B1 | 8/2002 | Hullinger | |
| 6,636,790 B1 | 10/2003 | Lightner et al. | |
| 6,732,031 B1 | 5/2004 | Lightner et al. | |
| 7,366,589 B2 | 4/2008 | Habermas | |
| 7,426,633 B2 | 9/2008 | Thompson et al. | |
| 7,449,132 B2 | 11/2008 | Kakuta et al. | |
| 7,506,309 B2 | 3/2009 | Schaefer | |
| 7,694,293 B2 | 4/2010 | Rao | |
| 7,704,918 B2 | 4/2010 | Adzic et al. | |

(Continued)

FOREIGN PATENT DOCUMENTS

| | | |
|---|---|---|
| CN | 102142538 | 8/2011 |
| CN | 102423705 A | 4/2012 |

(Continued)

OTHER PUBLICATIONS

First Office Action for Chinese Application No. 201210252758.5, dated Jul. 20, 2016, 8 Pages.

(Continued)

*Primary Examiner* — Ig T An
(74) *Attorney, Agent, or Firm* — Joseph Zane; Brooks Kushman P.C.

(57) ABSTRACT

A vehicle includes a controller powered by a controller power source independent from a vehicle power supply, programmed to responsive to detecting an in-vehicle network wakeup initiated by an electronic controller unit (ECU) requesting to communicate during a vehicle OFF state, record an ECU communication via the in-vehicle network; and responsive to detecting a vehicle ON state, send the recorded ECU communication to a server.

20 Claims, 3 Drawing Sheets

(56) References Cited

U.S. PATENT DOCUMENTS

| | | | |
|---|---|---|---|
| 7,848,278 B2 | 12/2010 | Chen et al. | |
| 8,187,745 B2 | 5/2012 | Tamura et al. | |
| 8,273,504 B2 | 9/2012 | Goia et al. | |
| 8,332,817 B2 | 12/2012 | Li et al. | |
| 8,555,273 B1 | 10/2013 | Chia et al. | |
| 8,655,541 B2 | 2/2014 | You | |
| 9,468,909 B2 | 10/2016 | Yang et al. | |
| 9,727,115 B1 * | 8/2017 | Brown | G05F 1/66 |
| 10,474,213 B1 * | 11/2019 | Brown | G06F 1/3296 |
| 2003/0139939 A1 | 7/2003 | Spool et al. | |
| 2003/0167354 A1 | 9/2003 | Pepper et al. | |
| 2004/0187011 A1 | 9/2004 | Lee et al. | |
| 2004/0197541 A1 | 10/2004 | Visco et al. | |
| 2004/0197641 A1 | 10/2004 | Visco et al. | |
| 2004/0261073 A1 | 12/2004 | Herle et al. | |
| 2005/0079402 A1 | 4/2005 | Tanaka et al. | |
| 2005/0149481 A1 | 7/2005 | Hesselink et al. | |
| 2005/0152318 A1 | 7/2005 | Elbatt et al. | |
| 2005/0216902 A1 | 9/2005 | Schaefer | |
| 2005/0216903 A1 | 9/2005 | Schaefer | |
| 2005/0256614 A1 | 11/2005 | Habermas | |
| 2007/0042252 A1 | 2/2007 | Kazarinov | |
| 2007/0083304 A1 | 4/2007 | Yamada | |
| 2007/0168957 A1 | 7/2007 | Li et al. | |
| 2007/0185624 A1 | 8/2007 | Duddles et al. | |
| 2007/0185646 A1 | 8/2007 | Neugebauer et al. | |
| 2007/0248874 A1 | 10/2007 | Aoyama | |
| 2007/0259267 A1 | 11/2007 | Ota et al. | |
| 2008/0005733 A1 | 1/2008 | Ramachandran et al. | |
| 2008/0162036 A1 | 7/2008 | Breed | |
| 2008/0167758 A1 | 7/2008 | Louch et al. | |
| 2008/0312070 A1 | 12/2008 | Talbot et al. | |
| 2009/0081511 A1 | 3/2009 | Miyazaki et al. | |
| 2009/0162750 A1 | 6/2009 | Kawakami et al. | |
| 2009/0208780 A1 | 8/2009 | Sun et al. | |
| 2009/0260057 A1 | 10/2009 | Laberteaux et al. | |
| 2009/0262714 A1 | 10/2009 | Lim et al. | |
| 2009/0265633 A1 | 10/2009 | Lim et al. | |
| 2010/0021819 A1 | 1/2010 | Zhamu et al. | |
| 2010/0120373 A1 * | 5/2010 | Wheatley | H04L 12/40006 701/36 |
| 2010/0127857 A1 * | 5/2010 | Kilmurray | G06F 1/3228 341/176 |
| 2011/0033746 A1 | 2/2011 | Liu et al. | |
| 2011/0078675 A1 | 3/2011 | Van Camp et al. | |
| 2011/0207019 A1 | 8/2011 | Mukerjee | |
| 2012/0077095 A1 | 3/2012 | Roumi et al. | |
| 2012/0091425 A1 | 4/2012 | Kawashima et al. | |
| 2012/0125154 A1 | 5/2012 | Manthiram et al. | |
| 2012/0144378 A1 | 6/2012 | Shah | |
| 2012/0145037 A1 | 6/2012 | DeLuca et al. | |
| 2012/0178018 A1 | 7/2012 | Querner et al. | |
| 2012/0183869 A1 | 7/2012 | Jin et al. | |
| 2012/0189943 A1 | 7/2012 | Campbell et al. | |
| 2012/0245397 A1 | 9/2012 | Bourane et al. | |
| 2013/0005567 A1 | 1/2013 | Kannan et al. | |
| 2013/0031540 A1 | 1/2013 | Throop et al. | |
| 2013/0245884 A1 | 9/2013 | Forutanpour et al. | |
| 2013/0326495 A1 | 12/2013 | Reunamaki et al. | |
| 2014/0054180 A1 | 2/2014 | Morimitsu | |
| 2014/0245284 A1 | 8/2014 | Alrabady et al. | |
| 2014/0282467 A1 | 9/2014 | Mueller et al. | |
| 2015/0128123 A1 | 5/2015 | Eling | |
| 2016/0266886 A1 | 9/2016 | Sarkar et al. | |
| 2018/0075674 A1 | 3/2018 | Utagawa et al. | |

FOREIGN PATENT DOCUMENTS

| | | |
|---|---|---|
| DE | 102004017602 A1 | 10/2005 |
| EP | 2891581 A1 | 7/2015 |
| GB | 2434884 B | 8/2009 |
| JP | 2004099355 A | 4/2004 |
| JP | 2006228546 A | 8/2006 |
| WO | 2009027208 A1 | 5/2009 |
| WO | 2011056290 A1 | 5/2011 |
| WO | 2012046138 A1 | 4/2012 |
| WO | 2012133136 A1 | 10/2012 |

OTHER PUBLICATIONS

Second Office Action for Chinese Application No. 201210252758.5, dated Nov. 28, 2016, 8 Pages.

Baker et al., Enhanced Oxygen Reduction Activity in Acid by Tin-Oxide Supported Au Nanoparticle Catalysts, Journal of The Electrochemical Society, 153 (9) A1702-A1707 (2006), 6 Pages.

Baturina et al., Oxygen Reduction Reaction on Platinum/Tantalum Oxide Electrocatalysts for PEM Fuel Cells, Journal of The Electrochemical Society, 155 (12) B1314-B1321, 2008.

Dong et al., Apr. 19, 2011. Graphene-Supported Platinum and Platinum-Ruthenium Nanoparticles for Fuel Cell Applications, Physics and Applications of Graphene—Experiments, Dr. Sergey Mikhailov (Ed.), ISBN 978-953-307-217-3, InTech, p. 525-541, 17 pages total.

Drew Technologies—CarDAQ-Plus J2534 Pass-Thru & Hosting Device, printed from allobd.com/proddetail, Oct. 29, 2010, 4 Pages.

Ford Motor Company, "SYNC with Navigation System," Owner's Guide Supplement, SYNC System Version 1 (Jul. 2007), 164 Pages.

Ford Motor Company, "SYNC with Navigation System," Owner's Guide Supplement, SYNC System Version 2 (Oct. 2008), 194 Pages.

Ford Motor Company, "SYNC with Navigation System," Owner's Guide Supplement, SYNC System Version 3 (Jul. 2009), 196 Pages.

Ford Motor Company, "SYNC," Owner's Guide Supplement, SYNC System Version 1 (Nov. 2007), 86 Pages.

Ford Motor Company, "SYNC," Owner's Guide Supplement, SYNC System Version 2 (Oct. 2008), 83 Pages.

Ford Motor Company, "SYNC," Owner's Guide Supplement, SYNC System Version 3 (Aug. 2009), 87 Pages.

Garsany et al., High-Activity, Durable Oxygen Reduction Electrocatalyst: Nanoscale Composite of Platinum-Tantalum Dxyphosphate on Vulcan Carbon, DOI: 10.1021/jz100681g J. Phys. Chem. Lett. 2010, 1, 1977-1981.

Gatewood et al., Support Effects on Water Activation and Oxygen Reduction over Au—SnOx Electrocatalysts Observed with X-Ray Absorption Spectroscopy, Journal of The Electrochemical Society, 155 (8) B834-B842 (2008).

He, Guoqiang et al., Oxygen Reduction Catalyzed By Platinum Nanoparticles Supported On Graphene Quantum Dots, American Chemical Society Catalysis, 2013, 3, pp. 831-838.

Korovina et al., Understanding Oxygen Reduction on Tantalum Oxyphosphate and Tantalum Oxide Supported Platinum by X-ray Absorption Spectroscopy, dx.doi.org/10.1021/jp302023h J. Phys. Chem. C 2012, 116, 18175-18183.

Kou et al., Stabilization of Electrocatalytic Metal Nanoparticles at Metal-Metal Oxide-Graphene Triple Junction Points, dx.doi.org/10.1021/ja107719u , J. Am. Chem. Soc. 2011, 133, 2541-2547.

Lancer Evolution: ECU Reflash Upgrade—2009 Ralliart remote ECU reflashing services, printed from http://www.foridaevosclub.com/f32/2009-ralliart-remote-ecu-relashing-services-41.htm, Sep. 17, 2009, 4 Pages.

Li, Yanguang, et al., An Oxygen Reduction Electrocatalyst Based On Carbon Nanotube-Graphene Complexes, Nature Nanotechnology, vol. , Jun. 2012, pp. 394-400.

Meng, Xiangbo et al., Non-Aqueous Approach to Synthesize Amorphous/Crystalline Metal Oxide-Graphene Nanosheet Hybrid Composites, 8 Pages.

Ramirez et al., Amorphous niobium oxide thin films, Journal of Non-Crystalline Solids 356 (2010) 2714-2721, 8 pages total.

Sasaki et al., Niobium oxide-supported platinum ulta-low amount electrocatalysts for oxygen reduction, Phys. Chem Chem. Phys., 2008, 10, 159-167; 9 Pages.

Sasaki et al., Ultra-low platinum content fuel cell anode electrocatalyst with a long-term performance stability, Electrochimica Acta 49 (2004) 3873-3877.

Tsuji et al., Electrocatalytic activity of amorphous RuO2 electrode for oxygen evolution in an aqueous solution, Electrochimica Acta 56 (2011) 2009-2016, 8 pages total.

(56) References Cited

OTHER PUBLICATIONS

Ueda et al., Electrochemical oxidation of CO in sulfuric acid solution over Pt and PtRu catalysts modified with TaOx and NbOx, Catalysis Today 84 (2003) 223-229, 7 pages total.
Whitfield, Kermit, "A hitchhiker's guide to the telematics ecosystem," Automotive Design & Production, Oct. 2003, http://findarticles.com, pp. 103, 3 Pages.
Wu, Gang et al., A Carbon-Nanotube-Supported Graphene-~Rich Non-Precious Metal Oxygen Reduction Catalyst With Enhanced Performance Durability, Chemical Communication, vol. 49, No. 32, Apr. 25, 2013, pp. 3265-3364.
Zhang et al., Oxygen Reduction Reaction Activity and Electrochemical Stability of Thin-Film Bilayer Systems of Platinm on Niobium Oxide, J. Phys. Chem. C., vol. 114, No. 39, pp. 16463-16474 (2010).
Zhang, Li et al., Highly Corrosion Resistant Platinum-Niobium Oxide-Carbon Nanotube Electrodes For The Oxygen Reduction in PEM Fuel Cells, Energy & Environmental Science, 2012, 5, pp. 6156-6172.

\* cited by examiner

US 11,639,142 B2

ELECTRONIC CONTROL MODULE WAKE MONITOR

TECHNICAL FIELD

The present disclosure is generally related to an in-vehicle network monitoring system. More specifically, the present disclosure is related to a vehicle system for monitoring an in-vehicle network for controller activities.

BACKGROUND

Modern vehicles are provided with various electronic control units (ECUs) to monitor and perform various vehicle features including telecommunication, powertrain controls, vehicle body function for instance. Due to the complexity of the vehicle features, some ECUs are configured to wake up to perform features when the vehicle is turned off. Sometimes, an ECU can wake up the entire in-vehicle network when the vehicle is in an OFF state which may consume a lot of battery power. The ECU wakeup may be normal by design. However, sometimes it may also be a caused by a hardware failure (e.g. short circuit), or a software glitch.

SUMMARY

In one or more illustrative embodiment of the present disclosure, a vehicle includes a controller powered by a controller power source independent from a vehicle power supply, programmed to responsive to detecting an in-vehicle network wakeup initiated by an electronic controller unit (ECU) requesting to communicate during a vehicle OFF state, record an ECU communication via the in-vehicle network; and responsive to detecting a vehicle ON state, send the recorded ECU communication to a server.

In one or more illustrative embodiment of the present disclosure, a vehicle system includes one or more controllers, programmed to responsive to detecting the vehicle enters an OFF state, activate a wake monitor connected to an in-vehicle network to monitor for activities; responsive to detecting the in-vehicle network switches from a sleep mode into a wakeup mode initiated from an electronic controller unit (ECU) requesting to communicate, record an ECU communication via the in-vehicle network and store the ECU communication in a storage of the wake monitor; and responsive to detecting vehicle enters one of an ON state or an accessory (ACC) state, load the ECU communication from the storage and send the ECU communication to a server.

In one or more illustrative embodiment of the present disclosure, a method for a vehicle includes responsive to detecting the vehicle enters an OFF state, activating a wake monitor connected to an in-vehicle network to monitor for activities; responsive to detecting the in-vehicle network switches from a sleep mode into a wakeup mode initiated from an electronic controller unit (ECU), recording an ECU communication via the in-vehicle network into a storage of the wake monitor; and responsive to detecting vehicle enters one of an ON state or an accessory (ACC) state, sending the ECU communication to a server.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The present disclosure, among other things, proposes an in-vehicle network monitoring system. More specifically, the present disclosure proposes a vehicle system for monitoring an in-vehicle network (e.g. a controller area network (CAN)) for controller activities when the vehicle is in an OFF state.

Figure 1:
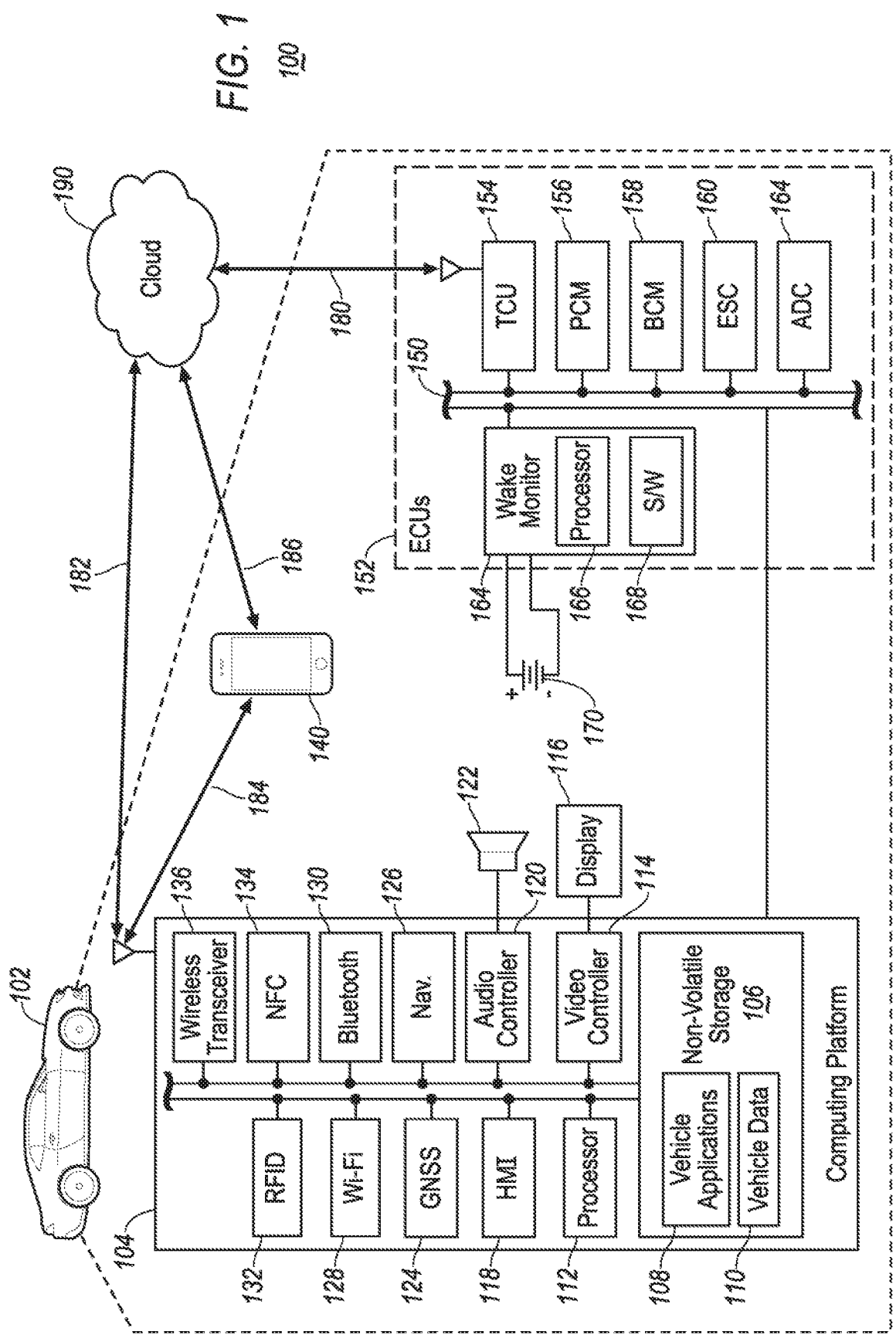
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be battery electric vehicle (BEV), a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 112 configured to perform instructions, commands, and other routines in support of the processes described herein. For instance, the computing platform 104 may be configured to execute instructions of vehicle applications 108 to provide features such as navigation, telecommunications or the like. Such instructions and other data may be maintained in a non-volatile manner using a variety of types of computer-readable storage medium 106. The computer-readable medium 106 (also referred to as a processor-readable medium or storage) includes any non-transitory medium (e.g., tangible medium) that participates in providing instructions or other data that may be read by the processor 112 of the computing platform 104. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 118 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 116 configured to provide visual output to vehicle occupants by way of a video controller 114. In some cases, the display 116 may be a touch screen further configured to receive user touch input via the video controller 114, while in other cases the display 116 may be a display only, without touch input capabilities. The computing platform 104 may also drive or otherwise communicate with one or more speakers 122 configured to provide audio output to vehicle occupants by way of an audio controller 120.

The computing platform 104 may also be provided with navigation and route planning features through a navigation controller 126 configured to calculate navigation routes responsive to user input via e.g., the HMI controls 118, and output planned routes and instructions via the speaker 122 and the display 116. Location data that is needed for navigation may be collected from a global navigation satellite system (GNSS) controller 124 configured to communicate with multiple satellites and calculate the location of the vehicle 102. The GNSS controller may be configured to support various current and/or future global or regional location systems such as global positioning system (GPS), Galileo, Beidou, Global Navigation Satellite System (GLONASS) and the like. Map data used for route planning may be stored in the storage 106 as a part of the vehicle data 110. Navigation software may be stored in the storage 116 e.g. as one of the vehicle applications 108.

The computing platform 104 may be configured to wirelessly communicate with a mobile device 140 of the vehicle users/occupants via a wireless connection 184 through a wireless transceiver 136. The mobile device 140 may be any of various types of portable computing device, such as cellular phones, tablet computers, smart watches, laptop computers, portable music players, or other device capable of communication with the computing platform 104. The wireless transceiver 136 may be in communication with a Wi-Fi controller 128, a Bluetooth controller 130, a radio-frequency identification (RFID) controller 132, a near-field communication (NFC) controller 134, and other controllers such as a Zigbee transceiver, an IrDA transceiver (not shown), and configured to communicate with a compatible wireless transceiver (not shown) of the mobile device 140.

The computing platform 104 may be further configured to communicate various electronic control units (ECUs) 152 via one or more in-vehicle network 150. The in-vehicle network 150 may include, but is not limited to, one or more of a CAN, an Ethernet network, and a media-oriented system transport (MOST), as some examples.

The ECUs 152 may include a telematics control unit (TCU) 154 configured to control telecommunication between vehicle 102 and a cloud 190 through a wireless connection 180 using a modem (not shown). Additionally or alternatively, the computing platform 104 may be configured to communicate with the cloud 190 via the mobile device 140 through a wireless connection 186. The computing platform 104 may be further configured to directly communicate with the cloud 190 via the wireless transceiver 136 using compatible protocols through a wireless connection 182. The cloud 190 may include one or more servers, or computers connected via various types of wired or wireless networks. It is noted that the term cloud is used as a general term throughout the present disclosure and may refer to any cloud-based services involving multiple servers, computers, devices and the like.

As a few non-limiting examples, the ECUs 152 may further include a powertrain control module (PCM) 156 configured to monitor and control the powertrain operation of the vehicle 102. For instance, the PCM 156 may include a vehicle immobilizer (not shown) configured to control the operating state of the vehicle 102. The PCM 156 may be configured to switch the vehicle 102 between an ON state and an OFF state. In the ON state, the vehicle 102 may have both the vehicle engine (or an electric motor) and the transmission active and the vehicle 102 ready to drive. The ECUs 152 and the in-vehicle network 150 may be in a wakeup mode to fully perform vehicle functions. In the OFF state, ECUs 152 and the in-vehicle network 150 may be put into a sleep mode to save power, while some ECUs 152 are allowed to perform limited operations according the vehicle features. For instance, a body control module (BCM) 158 (to be discussed below) may be configured to stay partially active to receive remote input (e.g. door lock/unlock) when the vehicle 102 is in the OFF state. The PCM 156 may be further configured to provide an accessory (ACC) state in which the vehicle engine is not running but some ECUs 152 and the in-vehicle network 150 are waken up to provide limited vehicle features (e.g. radio, telecommunication or the like).

The ECUs 152 may further include the BCM 156 configured to monitor and control body operations of the vehicle 102. For instance, the BCM 156 may be configured to control and monitor body functions such as door lock/unlock, remote controls, lighting or the like. The ECUs 152 may further include a heating, ventilation, and air conditioning (HVAC) controllers 160 configured to monitor and control the heating, air conditioning and/or climate operations of vehicle 102. The ECUs 152 may further include an autonomous driving controller (ADC) 164 configured to monitor and control the autonomous driving features of the vehicle 102. Some autonomous driving feature may include lane keep assist, safe distance from other vehicles, cruise control, autobraking, brake mitigation or the like. It is noted that the ECUs 152 illustrated with reference to FIG. 1 are merely examples and the vehicle 102 may including more ECUs 152 connected to the in-vehicle network 150 or other vehicle network configurations to perform various features described or not described herein.

The ECUs 152 may further include a wake monitor 164 configured to monitor the in-vehicle network 150 for ECU activities when the vehicle 102 is in the OFF state. The wake monitor 164 may be provided with processing power by a processor 166 configured to perform instructions, commands, and other routines in support of the processes described herein using software 168 stored locally in a storage. The wake monitor 164 may be powered by a power source 170 independent from the power supply for the vehicle 102. For instance, the power source may be rechargeable lithium-ion battery or an electric capacitor located inside or attached to the wake monitor 164 to supply power to the wake monitor when the vehicle 102 is in the OFF state. When the vehicle 102 is switched to the ON state or ACC state and power is supplied to ECUs 152 including the wake monitor 164, the wake monitor 164 may be configured to charge the power supply 170 using the power received from the battery or power supply of the vehicle 102. The wake monitor 164 may be configured to enter an active mode responsive to detecting the vehicle 102 is in the OFF state to monitor the in-vehicle network 150 for activities to find out which ECUs 152, if any, are waking up the in-vehicle network 150 from the sleep mode. The wake monitor 164 may record the activities occurred on the in-vehicle network 150 for future analysis to find the cause. Responsive to detecting the vehicle 102 switching out of the OFF state and entering the ON or ACC state, the wake monitor 164 may be configured to enter an inactive mode to stop monitoring the in-vehicle network 150.

Figure 2:
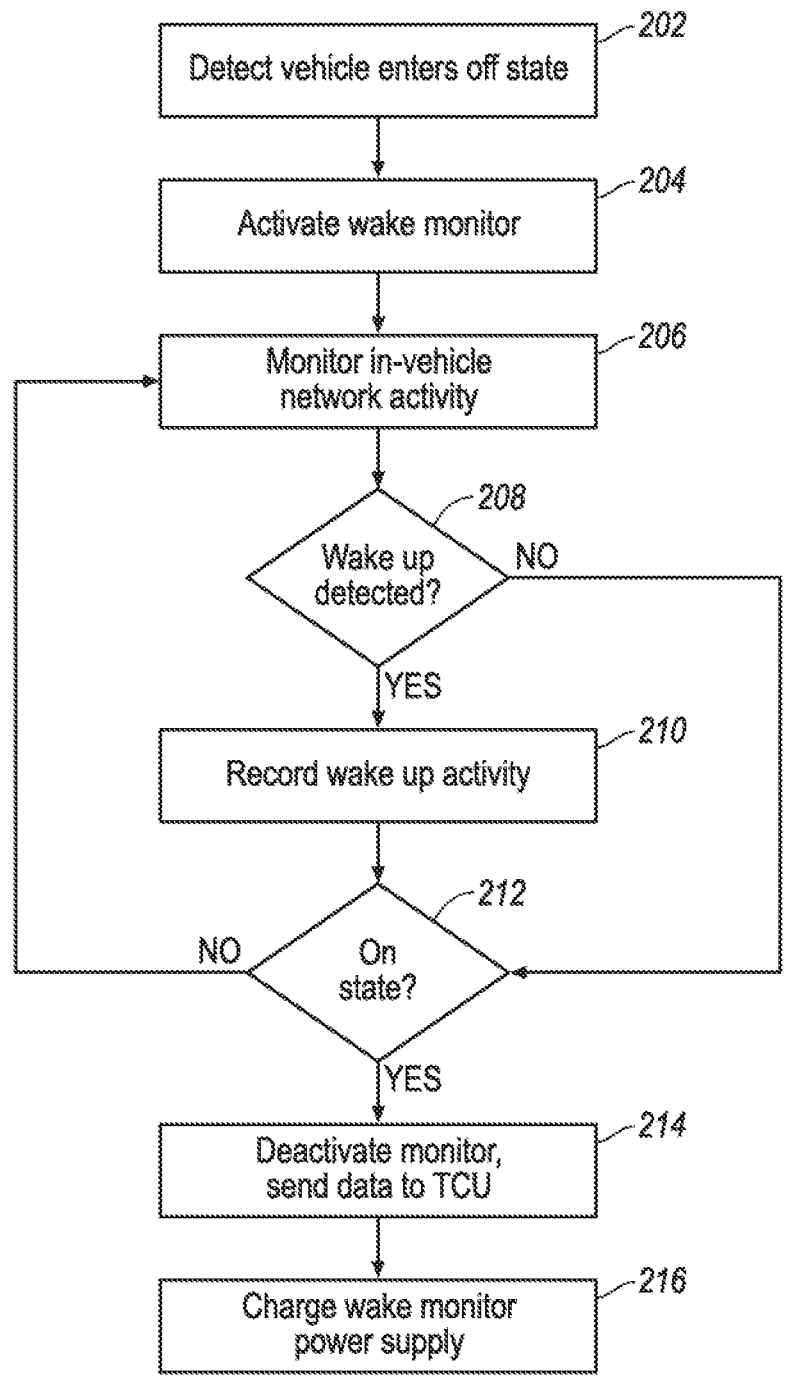
FIG. 2 illustrates an example flow diagram for a process of one embodiment of the present disclosure.

Referring to FIG. 2, an example flow diagram for a process 200 of one embodiment of the present disclosure is illustrated. With continuing reference to FIG. 1, at operation 202, the wake monitor 164 detects the vehicle 102 enters the OFF state e.g. using signals received from the in-vehicle network 150 or by detecting the power supply from the vehicle 102 is cut off. The in-vehicle network 150 may be configured to enter the sleep mode responsive to the vehicle 102 entering the off mode. Responsive to detecting the vehicle 102 has entered the off mode, the wake monitor activates the wake monitor feature and detect signals transmitted via the in-vehicle network 150. Since the vehicle 102 is in the OFF state and the in-vehicle network 150 is in the sleep mode, there should be no communication between ECUs 152 via the in-vehicle network 150 most of the time. As the wake monitor 164 continues to monitor for any activity on the in-vehicle network 150 at operation 206, if an in-vehicle network wakeup is detected at operation 208, the process proceeds to operation 210 and the wake monitor 164 records the wakeup activity detected as a wakeup record in the storage for future analysis. For instance, the wakeup record may include information about the time and the trigger of the wakeup detection. The wake monitor 164 may detect which ECU 152 is waking up the in-vehicle network 150 and what cause the ECU 152 to wake up the in-vehicle network 150 by recording the data on the in-vehicle network 150.

At operation 212, the wake monitor 164 detects if the vehicle 102 enters the ON state such as when a user starts to use the vehicle 102. If the answer is a no, the process returns to operation 206 and the wake monitor continues to monitor the in-vehicle network 150. Otherwise, if the wake monitor 164 detects the vehicle 102 has entered the ON state, the process proceeds to operation 214 and the wake monitor 164 deactivates the monitor feature and sends the recorded wakeup record to computing platform 104 and/or the TCU 154 to send out to the cloud for analysis. As an example, the computing platform 104 may serve an enhanced central gateway to coordinate the telecommunication and data report. At operation 216, the wake monitor 164 charges the power supply 170 using the power received from the vehicle 102.

Figure 3:
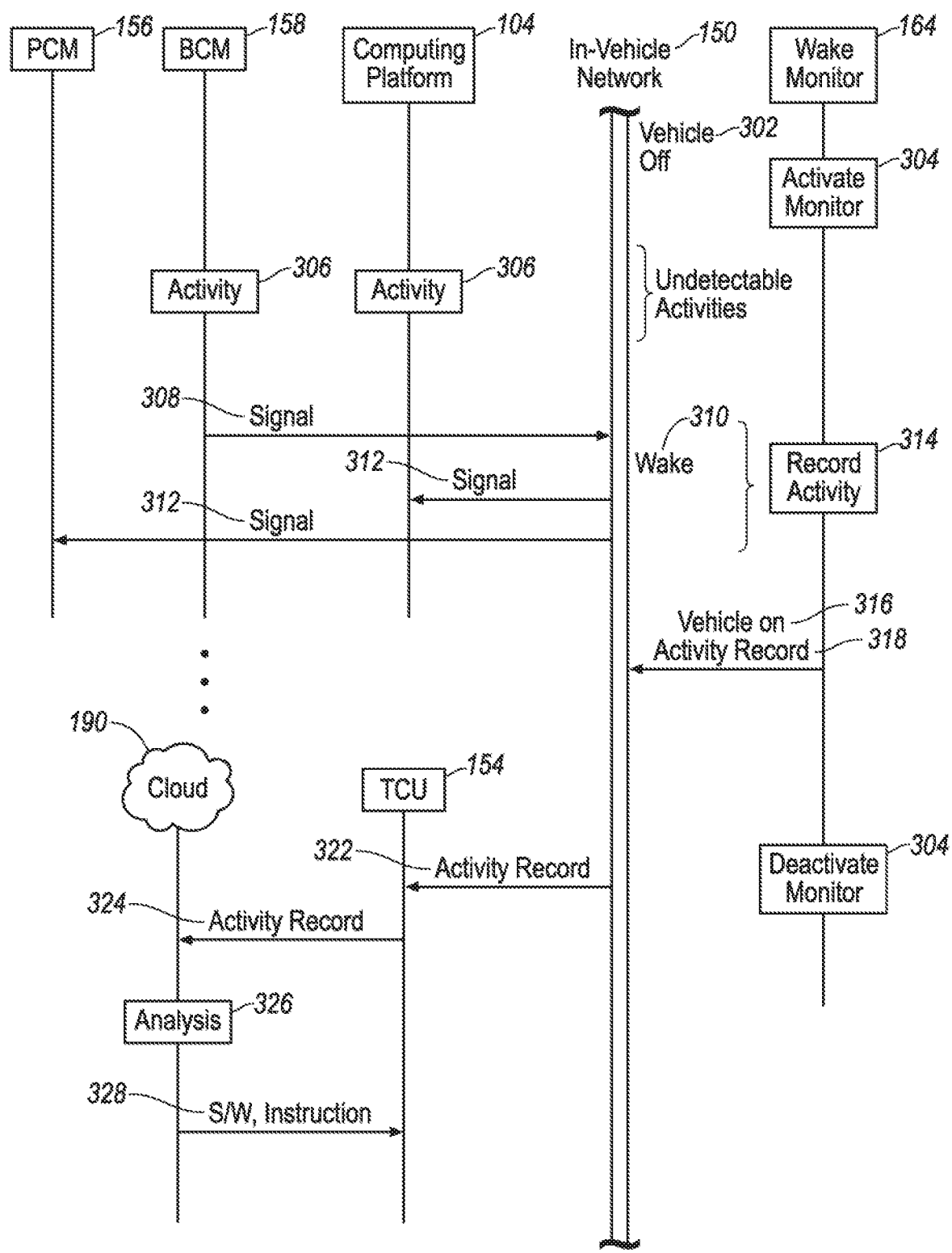
FIG. 3 illustrates an example data flow diagram for a process of one embodiment of the present disclosure.

The operations of the process 200 may be applied to various situations. For instance, referring to FIG. 3, an example data flow diagram 300 of one embodiment of the present disclosure is illustrated. At operation 302, the vehicle 102 turns off and enters the OFF state. In responsive, the in-vehicle network 150 enters a sleep mode to save power. Responsive to detecting the in-vehicle network 150 enters the sleep mode, the wake monitor 164 activates the monitor feature and starts to monitor the in-vehicle network 150 for activities at operation 304. Depending on the configurations of the ECUs 152, some ECUs may perform internal operations when the vehicle is in the OFF state. For instance, the BCM 158 may perform some internal operations 306 without communicating with other components of the vehicle 102 via the in-vehicle network 150 at operation 306. Similarly, the computing platform 104 may also perform internal operation 306. Such internal operations may not be detectable by the wake monitor because the in-vehicle network 150 is still asleep.

At operation 308, the BCM sends a signal to the in-vehicle network 150 to communicate with other ECUs/components of the vehicle 102 at operation 312. Responsive to receiving the signal from the BCM 158, at operation 310, the in-vehicle network 150 wakes up from the sleep mode to perform/facilitate the signal communication between the BCM 158, the PCM 156 and the computing platform 104. At operation 314, responsive to detecting the in-vehicle network 150 wakes up, the wake monitor 164 records activities on the in-vehicle network 150. For instance, the wake monitor 164 may record the time of each signal communication 308 and 312. Additionally, the wake monitor 164 may record the identity of the ECUs 152 involved in the transaction, especially the identity of the source ECU initiating the signal communication, which in the present example, is the BCM 158. Although the in-vehicle network 150 is in the wakeup mode, the vehicle 102 is still in the OFF state. The wake monitor 164 may detect the vehicle 102 the vehicle 102 is still in the OFF state through various means such as the power supply or the like. The wake monitor 164 may be configured to save the activity record and not send the record out until later when the vehicle 102 enters the ON or ACC state, to save power and avoid contaminating the signals on the in-vehicle network 150 during the vehicle OFF state.

At operation 316, the vehicle 102 is turned on and enters the ON (or ACC) state. In response, the wake monitor 164 sends the activity record to the TCU 154 (or the computing platform 104) via the in-vehicle network 150 at operations 318 and 322. The wake monitor 164 deactivates the monitor feature at operation 320. Since the vehicle 102 is turned on and other ECUs 152 are activated, there will be many signals on the in-vehicle network 150 and keep monitoring will not be very useful.

At operation 324, responsive to receiving the activity record form the wake monitor 164, the TCU 154 sends the activity record to the cloud 190 for analysis to identify patterns of unnecessary or abnormal ECU activities. Alternatively, the activity record may be sent to the cloud 190 via the mobile device 140 or the wireless transceiver 136 wirelessly connected to the cloud. The analysis operation 326 in the cloud may be automatically performed by a server using a pre-defined algorithm. Additionally or alternatively, the analysis 326 may be performed manually by engineers and technician associated with the cloud 190. At operation 328, responsive to determining any unnecessary or abnormal ECU activities, the cloud 190 sends a software update and/or an instruction to the TCU 154 to address the issue. For instance, cloud may detect the abnormal ECU activities to be caused by a software glitch and can be fixed by a software update. Alternatively, responsive to determining the abnormal activities may be caused by a hardware failure (e.g. a short circuit) or the issue needs to be further examined, the cloud may send an instruction to the vehicle 102 to advise the vehicle user to take the vehicle 102 to a dealer for further examination.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
a controller powered by a controller power source independent from a vehicle power supply, programmed to
responsive to detecting an in-vehicle network enters into a sleep mode, monitor activities of the in-vehicle network,
responsive to detecting an in-vehicle network wakeup when the vehicle is in an OFF state, identify the in-vehicle network wakeup is initiated by a first electronic controller unit (ECU) requesting to communicate with a second ECU via the in-vehicle network during a vehicle OFF state, flag the first ECU to be a source of the in-vehicle network wakeup, and record an ECU communication associated with the first ECU via the in-vehicle network, and
responsive to detecting a vehicle ON state, send the recorded ECU communication to a server.

2. The vehicle of claim 1, wherein the controller is further programmed to
responsive to detecting the vehicle enters ON state, deactivate monitoring to the in- vehicle network.

3. The vehicle of claim 1, wherein the controller is further programmed to send the recorded ECU communication via a telematic control unit (TCU).

4. The vehicle of claim 1, wherein the recorded ECU communication include at least one of: an identity of first ECU causing the wakeup, an identity of the second ECU involved in communication via the in-vehicle network during the in-vehicle network wakeup.

5. The vehicle of claim 1, wherein the controller is further programmed to
responsive to detecting the vehicle enters ON state, recharge the controller power source using power from the vehicle power supply.

6. The vehicle of claim 1, wherein the in-vehicle network includes at least one of: a controller area network (CAN), an Ethernet network, or a media-oriented system transport (MOST).

7. A vehicle system, comprising:
one or more controllers, programmed to
responsive to detecting the vehicle enters an OFF state, activate a wake monitor connected to an in-vehicle network to monitor for activities;
responsive to detecting, while the vehicle is in the OFF state, the in-vehicle network switches from a sleep mode into a wakeup mode initiated from an electronic controller unit (ECU) requesting to communicate, record an ECU communication via the in-vehicle network and store the ECU communication in a storage of the wake monitor; and
responsive to detecting vehicle enters one of an ON state or an accessory (ACC) state, load the ECU communication from the storage and send the ECU communication to a server.

8. The vehicle system of claim 7, wherein the one or more controllers are further programmed to
power the wake monitor via a power source independent from a vehicle power supply.

9. The vehicle system of claim 8, wherein the one or more controllers are further programmed to
responsive to detecting vehicle enters an ON state, recharge the power source using power from the vehicle power supply.

10. The vehicle system of claim 7, wherein the in-vehicle network includes at least one of: a controller area network (CAN), an Ethernet network, or a media-oriented system transport (MOST).

11. The vehicle system of claim 7, wherein the ECU communication include at least one of: time of in-vehicle network wakeup, identity of a source ECU causing the wakeup, or identities of ECUs involved in communication via the in-vehicle network during the in-vehicle network wakeup, data communicated between ECUs via the in-vehicle network.

12. The vehicle system of claim 7, wherein the one or more controllers are further programmed to
responsive to detecting the vehicle enters the ON state, deactivate the wake monitor.

13. The vehicle system of claim 7, wherein the one or more controllers are further programmed to
send the ECU communication to the server via a TCU.

14. The vehicle system of claim 7, wherein the one or more controllers are further programmed to
send the ECU communication to the server via a mobile device wirelessly connected to the vehicle system.

15. The vehicle system of claim 7, wherein the one or more controllers are further programmed to
receive a software update from the server to address the wakeup for the in-vehicle network.

16. A method for a vehicle, comprising:
responsive to detecting the vehicle enters an OFF state, activating a wake monitor connected to an in-vehicle network to monitor for activities;
responsive to detecting the in-vehicle network switches from a sleep mode into a wakeup mode initiated from an electronic controller unit (ECU), identifying the ECU to be a source that wakes up the in-vehicle network and recording an ECU communication associated with the ECU via the in-vehicle network into a storage of the wake monitor; and
responsive to detecting vehicle enters one of an ON state or an accessory (ACC) state, sending the ECU communication to a server.

17. The method of claim 16, further comprising:
powering the wake monitor via a power source independent from a vehicle power supply.

18. The method of claim 16, wherein the ECU communication include at least one of: time of in-vehicle network wakeup, identity of a source ECU causing the wakeup, or identities of ECUs involved in communication via the in-vehicle network during the in-vehicle network wakeup, data communicated between ECUs via the in-vehicle network.

19. The method of claim 16, further comprising:
responsive to detecting the vehicle enters the ON state, deactivating the wake monitor.

20. The method of claim 16, further comprising:
sending the ECU communication to the server via a mobile device wirelessly connected to the vehicle.

* * * * *